(12) United States Patent　　(10) Patent No.: US 7,453,903 B2
Chinitz　　(45) Date of Patent: Nov. 18, 2008

(54) SYSTEM AND METHOD FOR DETERMINING PRIORITIES IN A WIRELESS NETWORK

(75) Inventor: Leigh M. Chinitz, Wellesley, MA (US)

(73) Assignee: Proxim Wireless Corporation, San Jose, CA (US)

( * ) Notice: Subject to any disclaimer, the term of this patent is extended or adjusted under 35 U.S.C. 154(b) by 715 days.

(21) Appl. No.: 11/023,059

(22) Filed: Dec. 22, 2004

(65) Prior Publication Data

US 2005/0147056 A1　　Jul. 7, 2005

Related U.S. Application Data

(60) Provisional application No. 60/534,889, filed on Jan. 7, 2004.

(51) Int. Cl.
 *H04L 12/403* (2006.01)
(52) U.S. Cl. .................. 370/455; 370/444; 370/338; 370/310; 370/395.42; 455/435.3; 455/512; 455/166.2
(58) Field of Classification Search .......... 370/310, 370/338, 455, 444, 395.42; 455/435.3, 512, 455/166.2
See application file for complete search history.

(56) References Cited

U.S. PATENT DOCUMENTS

| | | | |
|---|---|---|---|
| 5,752,193 A | 5/1998 | Scholefield et al. | |
| 6,519,260 B1 | 2/2003 | Galyas et al. | |
| 6,621,803 B2 | 9/2003 | Halton et al. | |
| 6,657,980 B2 | 12/2003 | Holtzman et al. | |
| 7,095,732 B1* | 8/2006 | Watson, Jr. | 370/346 |
| 7,233,603 B2* | 6/2007 | Lee | 370/445 |
| 2002/0142789 A1* | 10/2002 | Kuhl et al. | 455/512 |
| 2003/0012167 A1 | 1/2003 | Benveniste | |
| 2003/0058824 A1 | 3/2003 | Petterson et al. | |
| 2003/0189948 A1 | 10/2003 | Sashihara | |

OTHER PUBLICATIONS

International Search Report, PCT/US2005/00547, dated Jul. 31, 2006.

* cited by examiner

*Primary Examiner*—Duc Nguyen
*Assistant Examiner*—Aung T Win
(74) *Attorney, Agent, or Firm*—Townsend and Townsend and Crew LLP

(57) ABSTRACT

A wireless network device that assigns priorities to communications in a network has a first circuit for receiving wireless messages from remote wireless network devices and a second circuit operable to send wireless messages to the remote wireless network devices. A third circuit makes a determination of the relative priorities of the remote wireless network devices. The wireless network device is operable to form a message to the remote wireless network devices, where the message is used to set a backoff time in the remote wireless network devices. The backoff time sent to the remote wireless network device is related to the relative priority of the remote wireless network device.

7 Claims, 5 Drawing Sheets

SYSTEM AND METHOD FOR DETERMINING PRIORITIES IN A WIRELESS NETWORK

This application claims the benefit of U.S. Provisional Application No. 60/534,889, filed on Jan. 7, 2004.

FIELD OF THE INVENTION

The present invention relates to a wireless communication system. More particularly, the present invention is related to a wireless data transfer system that can dynamically prioritize communications between several differing remote wireless devices, differing datastreams, and differing message types.

BACKGROUND

A popular Medium Access Control (MAC) method for wireless local area networks is a Carrier Sense Multiple Access Collision Avoidance (CSMA/CA). This method works by measuring the time since the last activity on the shared communication channel in equal length contention slots. Each transmitting unit in the network generates a random number, then counts the number of contention slots until the number is reached. At that point the transmitting node can grab the channel and other nodes must suspend their count until the channel is free again.

If, by chance, two nodes generate the same or random number and, thus, collide, they determine that the packet transfer was unsuccessful through the acknowledgement process. In this case the nodes generate a new random number to start counting slots from zero to the next time the channel is ready to transmit.

In several wireless networking protocols, such as the 802.11 wireless protocol, a transmitting node can reserve a particular slot through transmitting at that time. In this case, a node can reserve a set amount of time for the transmission cycle of the particular data.

For example, in the 802.11 protocol, the transmitting nodes reserve a particular transmission length of time by initiating a Request To Send (RTS) packet. Inside the packet, the RTS contains a field that reserves a particular amount of time for the transmission of the data. The receiving node receives the RTS and the associated reservation of time.

The receiving node then sends a Clear To Send (CTS) response. In the 802.11 protocol, the CTS also contains the reservation parameter that was sent in the RTS. In this manner, all nodes in range of the transmitting node receive the RTS and the associated reservation. Additionally, all the nodes within the transmitting range of the receiving node receive the CTS with the corresponding reservation. As such, all the nodes within the transmission range of both the transmitting node and receiving node will know the appropriate reservation for the channel. In this case all the nodes within range of both the transmitting node and receiving node will know the appropriate reservation. From this manner all the nodes within receiving range can determine not to transmit and interrupt the data link between the transmitting node and the receiving node. In this manner, the reservation effectively quiets communication around the transmitter and the receiver for the reserved period. However, a proper prioritization may not be accomplished by such a system. The backoff times may tend to overlap, and transmissions from a more important wireless network device may get put back when the random backoff from a not as important is less than the backoff in wireless network device having a more important transmissions.

SUMMARY

A wireless network device that assigns priorities to communications in a network is envisioned. The wireless network device has a first circuit for receiving wireless messages from remote wireless network devices and a second circuit operable to send wireless messages to the remote wireless network devices. A third circuit makes a determination of the relative priorities of the remote wireless network devices. The wireless network device is operable to form a message to the remote wireless network devices, where the message is used to set a backoff time in the remote wireless network devices. The backoff time sent to the remote wireless network device is related to the relative priority of the remote wireless network device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system and method for determining priorities in a wireless network. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of digital systems, including hardware, software, or any combination thereof. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
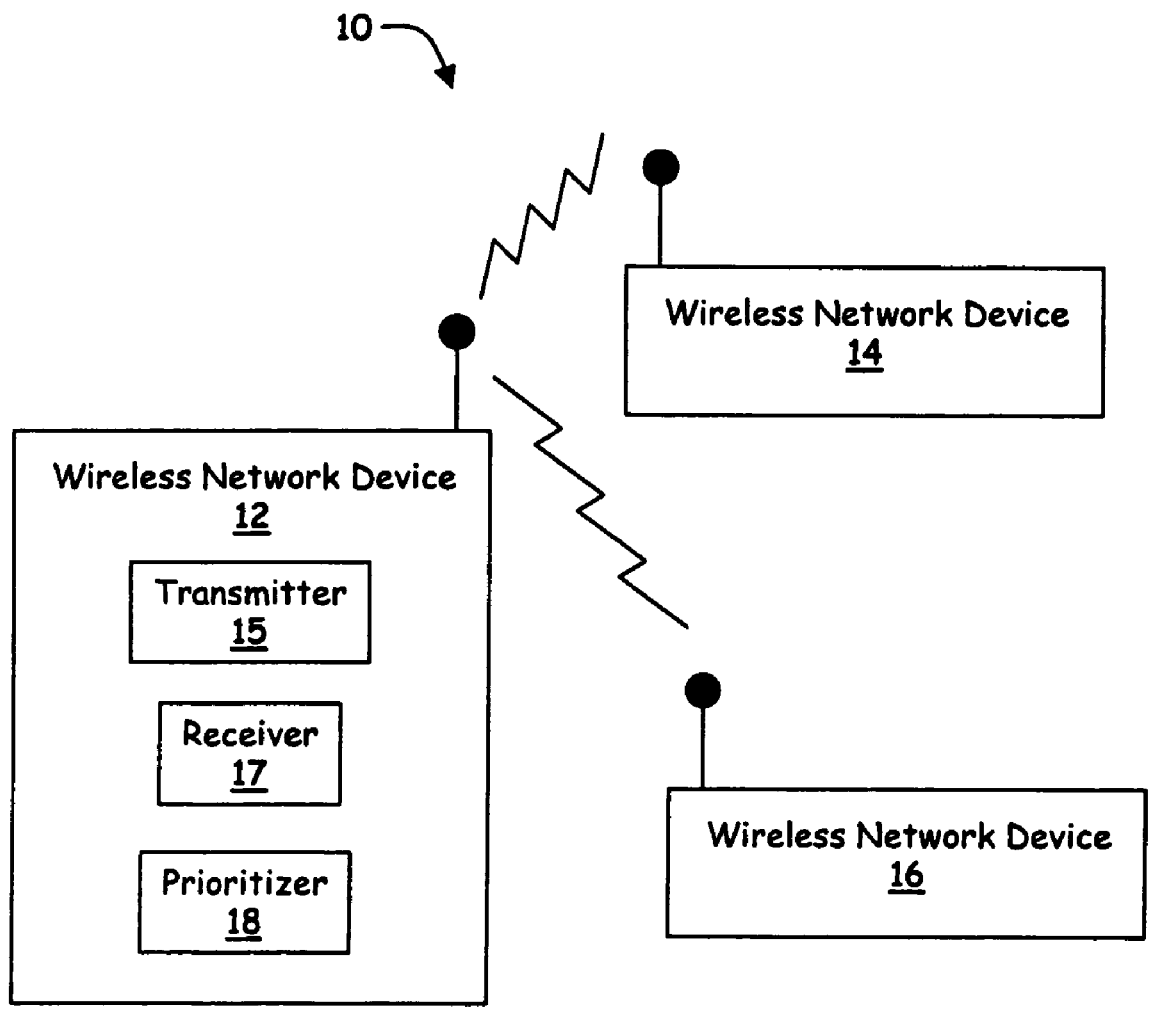
FIG. 1 is a schematic diagram of a wireless network implementing a prioritized operation according to the invention.

FIG. 1 is a schematic diagram of a wireless network implementing a prioritized operation according to the invention. A wireless network 10 has a wireless network device 12 and wireless network devices 14 and 16.

The wireless network device 12 has a transmitter 15 and a receiver 17, by which it communicates with the other wireless network devices 14 and 16. The wireless network device 12 also has a prioritizer 18. This prioritizer 18 allows the wireless network device 12 to assign priorities to any of the wireless network devices that it is in communication with.

The wireless network device 12 is in communication with the other wireless network devices in wireless network 10, namely the wireless network device 14 and the wireless network device 16. The wireless network device 12 can assign a priority to the individual wireless network devices within the wireless network 10. Or, it can assign priorities to specific data streams to an individual wireless network device, or assign priorities to specific types of messages. In this manner the wireless network device 12 can stratify the communications in the network and ease their workload.

As stated before, this prioritizer allows the wireless network device 12 determine the priority schedules over the individual wireless network devices within the wireless network device 10, specific types of messages, or specific datastreams. The prioritizer 18 can operate through straight assignments or with computed priorities. The priorities may be specifically set or altered through a user interfaces and allow am operator to set the various priorities of the wireless network 10. Or, the prioritizer 18 can respond to requests from the individual wireless network device for increasing or decreasing the priorities.

In FIG. 1, the wireless network device 12 is in communication with the wireless network device 14 and the wireless network device 16. In the first mode of operation, the wireless network device 12 monitors the amounts and frequency of communication and data to the various wireless network devices coupled in the wireless network 10. The number and frequency of communications in associated with the external wireless network devices are relayed to the prioritizer 18. The prioritizer 18 may increase or decrease the priority of a specific wireless network device, a specific message type, or specific message streams based upon traffic flow.

For example, assume that initially the traffic between the wireless network device 12 and the wireless network device 14 is comparably equal to the traffic between the wireless network device 12 and the wireless network device 16. However, assume that the traffic between the wireless network device 12 and the wireless network device 14 increases, such that measurably more traffic is passed between the wireless network device 12 and wireless network device 14. This increased traffic flow between the wireless network device 12 and the wireless network device 14 is relayed to the prioritizer 18.

The prioritizer 18 uses this communication data to determine that an increase in network data between the wireless network device 12 and the wireless network device 14 warrants an increase in priority. The prioritizer 18 indicates an increase in the priority of the communication link between wireless network device 12 and the wireless network device 14 to the wireless network device 12. In turn, this increase in priority is relayed by the wireless network device 12 to the wireless network device 14. Thus, an increased priority is effectuated between the wireless network device 12 and the wireless network device 14.

Next, assume that the data traffic between the wireless network device 12 and the wireless network device 16 decreases. In this case, in a manner substantially similar to that described above for the data traffic between the wireless network device 12 and the wireless network device 14, the prioritizer 18 determines that a decrease in communication traffic between the wireless network device 12 and the wireless network device 16 warrants a decrease in priority of such communication. To effectuate this, the prioritizer 18 indicates a decrease in the priority of the communication link between wireless network device 12 and the wireless network device 16 to the wireless network device 12. In turn, this decrease in priority is relayed by the wireless network device 12 to the wireless network device 14. Thus, an increased priority is effectuated between the wireless network device 12 and the wireless network device 14.

The method by which the prioritizer could determine such changes in the priority of the network traffic may happen in numerous ways. Numerous statistical and computational methods are known, and should be contemplated as part of this disclosure.

In another operation, the individual wireless network device communicatively coupled to the wireless network device 12 requests a priority change. For example, assume that wireless network device 14 determines that a large amount of data is needed to be transmitted to the wireless network device 12. In this case, the wireless network device 14 requests that the wireless network device increase the priority of the transmission link between wireless network device 12 and the wireless network device 14. The wireless network device 14 communicates such a request to the wireless network device 12, from which the request is sent to the prioritizer 18. The prioritizer 18 may accept, in whole or in part, or deny such request from the wireless network device 14 for a change in priority.

In one aspect, the prioritizer 18 compares the request of priority to current or historical network characteristics or operational parameters. If the request is acceptable, the prioritizer alters the internal representation of the priority and, as such, accepts the request for change. If the request does not fit into the operational scheme of the network, the request is denied.

It should be noted that specific external wireless network devices can be excluded from request. Thus, any request from one of the excluded devices would be automatically rejected.

The denial or the acceptance of the request by the prioritizer 18 is relayed from the wireless network device 12 to the wireless network device 14. As such a priority change may be initiated by a remote wireless device in this manner.

In another aspect, the request may be granted in part. Assume that the wireless network device 14 requests a priority change of two levels. The prioritize can grant a partial acceptance of only one level as opposed to the full two level request.

One way to implement a priority scheme between wireless network devices in a wireless network is to alter the backoff parameter in the operation of the wireless network device. In an exemplary embodiment, the 802.11 wireless specification uses Carrier Sense/Multiple Access Collision Avoidance (CSMA/CA). This method requires that each station listen for other transmitters. If the channel is idle, the station may transmit.

However, if the channel is busy, each station waits until the current transmission stops, and then enters into a random backoff procedure. A random wait time with a maximum backoff is established at the wireless network device. This value is placed into a counter, and the number is decremented. When the counter counts down to zero, the wireless network device attempts to transmit. If a transmission is occurring at this time, a new random generated backoff is generated. This scheme prevents multiple stations from seizing the medium immediately after the completion of the preceding transmission.

One proposed method of establishing priorities among wireless network devices is to use differing backoff parameters depending upon the priority level. The following Table 1 illustrates the implementation of a ten level priority system and associated backoff amounts.

| Priority Level | Backoff Time |
| --- | --- |
| 1 | 5 |
| 2 | 10 |
| 3 | 15 |
| 4 | 20 |
| 5 | 25 |

It should be noted that in the typical 802.11 standard, the backoff is set to the same amount of each wireless network device. Thus, each wireless network device uses the same maximum bounds for the randomly generated backoff.

In this case in using differing priorities, the maximum bound for the backoff differ the priority levels. Thus, the maximum backoff period for a wireless network device operating at priority level 5 is 25 units. The maximum bounds backoff for a device operating at priority level 1 is only 5 units. Thus, the priorities as defined do not strictly limit the transmissions from the various wireless network devices. However, they do give a probabilistic advantage to those operating at the higher priority levels.

Figure 2:
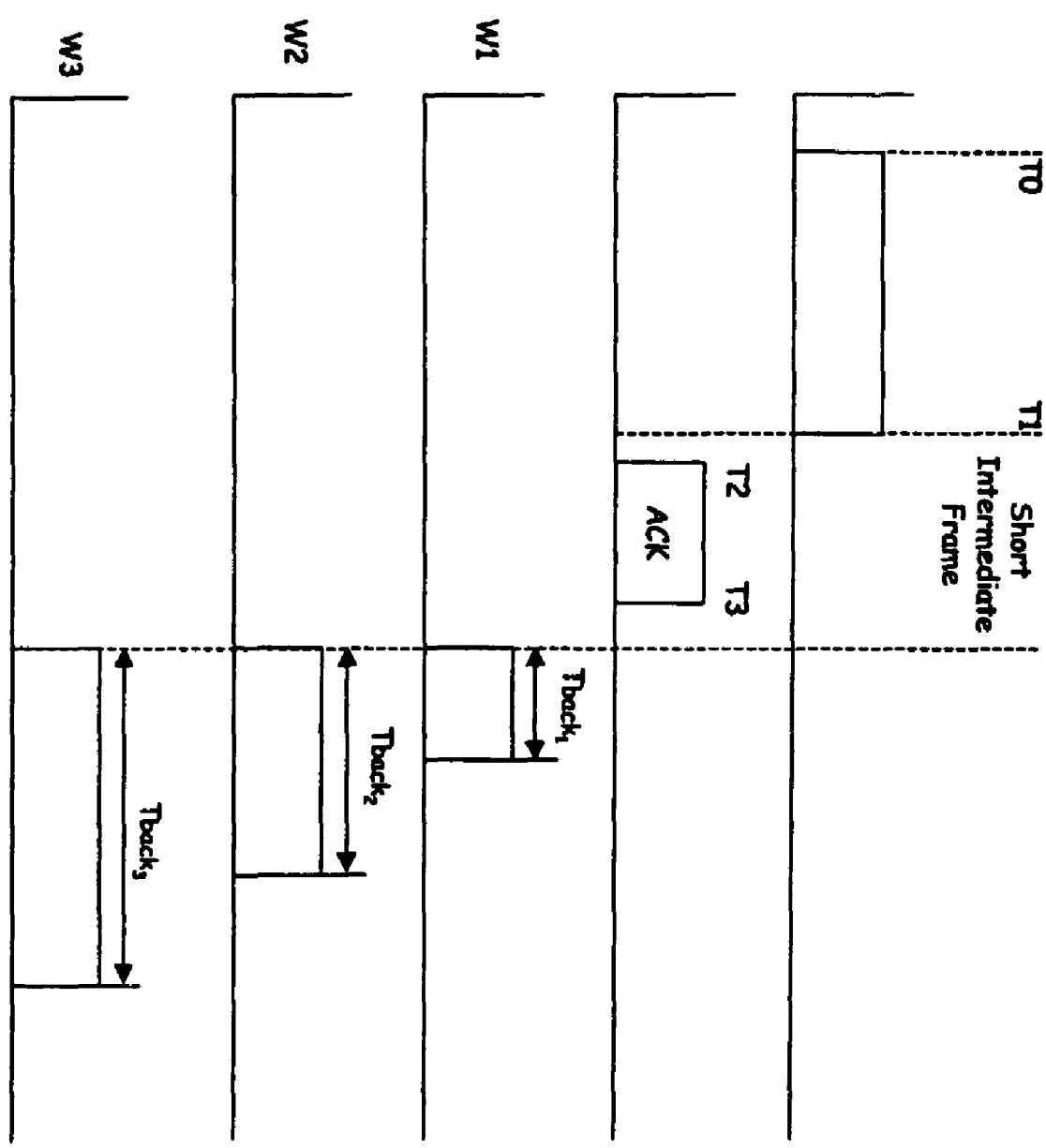
FIG. 2 is a timing diagram showing an exemplary backoff scheme that could be used with the priority-setting wireless network device of FIG. 1.

FIG. 2 is a timing diagram showing an exemplary backoff scheme that could be used with the priority-setting wireless network device of FIG. 1. At time T0, a transmission is under way from the pswnd to another wireless network device. During the time from T0 to T1. other wireless network devices within range do not attempt to transmit due to the transmission from the pswnd. Thus, the transmission lines of the other wireless network devices, denoted by the lines W1, W2 and W3, and corresponding to a first, second, and third wireless network device indicate that no transmissions are occurring.

In our example, the wireless network device denoted by line W1 has been assigned a priority of one, the wireless network device denoted by line W2 has been assigned a priority of two, and the wireless network device denoted by the line W3 has been assigned a priority of three. Thus, the wireless network devices W1, W2 and W3 sense the end of the transmission at time T1. Accordingly, an appropriate backoff is determined for each individual wireless network device.

In the 802.11 standard, the recipient wireless network device transmits an acknowledgement (ACK) at time T2 and then at time T3. In an 802.11 implementation, the backoff is implemented to occur subsequent to a short intermediate frame, the short intermediate frame corresponding to the length of the ACK from time T2 to time T3. This ensures that the ACK is not interfered with Since the wireless network device corresponding to line W1 has a priority of one, the backoff period it determines falls within the range of the time denoted by T(back) 1. This backoff time is bounded by 5 units points from the end of the short intermediate frame, corresponding to the ACK. The wireless network device corresponding to line W1 starts to decrement the backoff, and will start to transmit at the when the backoff counter is decremented to zero. Thus, the wireless network device corresponding to the line W1 will begin to transmit within the T(back) 1 units after the time T3.

Correspondingly, the wireless network device W2, having a priority of two, has a different backoff time denoted by the length T(back)2. Accordingly, the wireless network device corresponding to the line W3 will begin to transmit within T(back) 2 units of the end of the short intermediate frame.

Similarly, the wireless network device W3, having a priority of three has still another backoff length, denoted by T(back)3. In this manner, wireless network device corresponding to the line W3 will be transmit within T(back) 3 units of the end of the short intermediate frame.

As shown, the backoff lengths, T(back) 1, T(back)2, and T(back)3 are all different. Thus, the probability of the wireless network device corresponding to the line W1 beginning transmission before the wireless network device corresponding to the line W2 is probabilistically greater, since the backoff length T(back)1 is less than the backoff length T(back)2. In a similar manner, the wireless network device corresponding to the line W1 has a greater probability of transmitting prior to the wireless network device corresponding to the line W3, and the wireless network device corresponding to the line W2 has a greater probability of transmitting before the wireless network device corresponding to the line W3. Thus, by setting different backoff lengths for each priority, a priority system can be assigned to different wireless network device devices within the wireless network.

Figure 3:
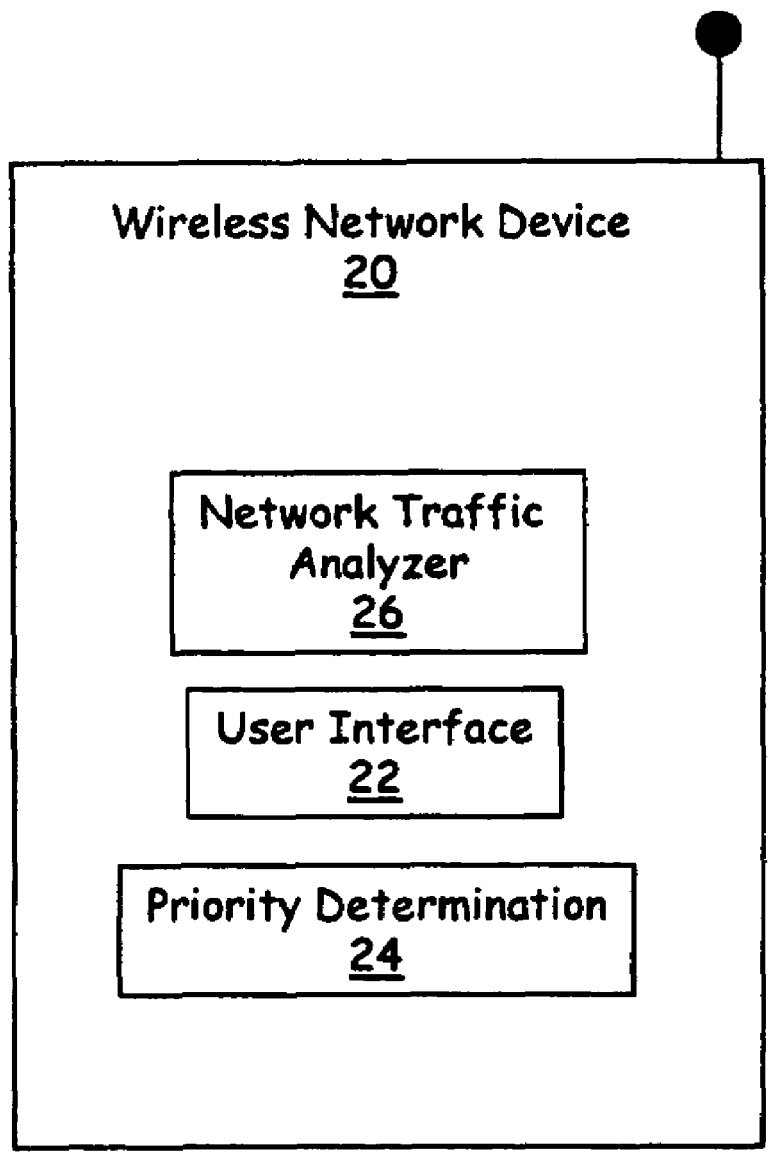
FIG. 3 is a schematic block diagram of an exemplary priority-setting wireless network device of FIG. 1.

FIG. 3 is a schematic block diagram of an exemplary priority-setting wireless network device of FIG. 1. A wireless network device 20 has a network traffic analysis section 26, a user interface 22, and a priority determination section 24. In an exemplary environment, the wireless network device 20 can set priorities of wireless network devices and communication in various ways.

In one case, the wireless network device 20 may set priorities according to a static schedule. In this case, an external wireless network device, as accomplished with the wireless network device 20, would be assigned a priority based on a straight allocation. In this case, the first wireless network device to couple to the wireless network device 20 receives a priority of one. The next external wireless network device coupling to the wireless network device coupling to the wireless network device 20 then receives a priority of two, and so on. As such the priorities of the external devices are set so that they are stratified. When the priority levels are exhausted, they may be reused, allowing for multiple entries in each priority strata.

The wireless network device 20 can determine the priorities based on the results of transmissions. As explained before, wireless network device 20 analyzes the transmission traffic with the network traffic analysis section 26. Based upon the results of the network traffic analysis section 42, the priorities can be incremented or decremented, and new priorities would be assigned based upon the results of this network traffic analysis section 42.

In another mode, the wireless network device 20 has a user interface 22. In this manner an operator may manually set each of the externally coupled wireless network device priorities. The operator may interact with the user interface 22 to set the various priorities in the external wireless network devices that form the wireless network.

Figure 4:
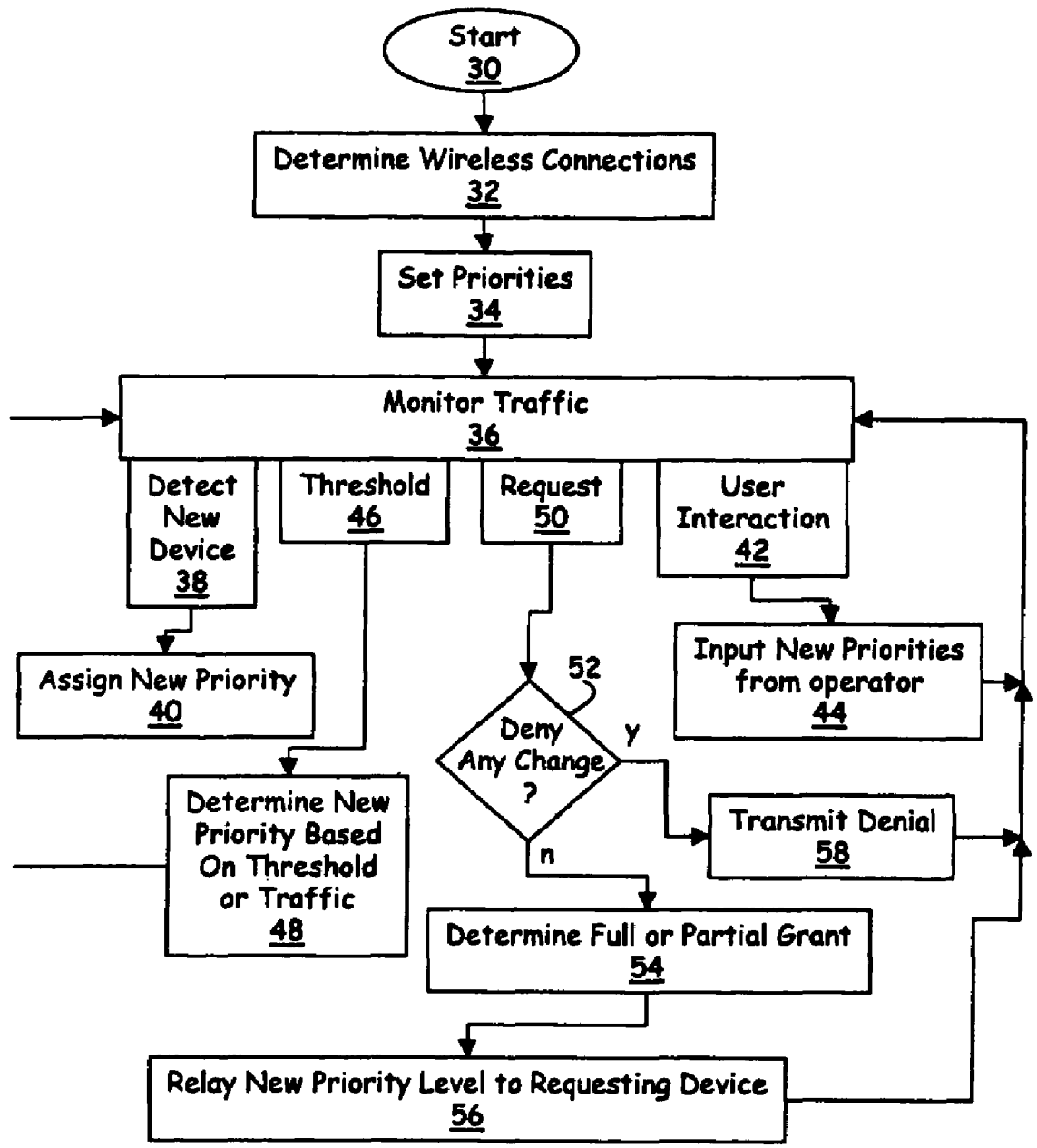
FIG. 4 is an exemplary block diagram of an exemplary operation of the priority-setting wireless network device of FIG. 1.

FIG. 4 is an exemplary block diagram of an exemplary operation of the priority-setting wireless network device of FIG. 1. In a block 30 the wireless network device having the priority mechanisms has started. In a block 32 the wireless network device determines which external wireless network devices it has a communication to. In a block 34 the wireless network device then sets the various priorities of the communication links.

In block 36 the wireless network device monitors the incoming traffic from the external wireless network devices. In block 38, another wireless network device is started with an operating range of the priority setting wireless network device. In this case, the wireless network device can assign a priority to the newly detected device, as shown in a block 40. The wireless network device then returns to monitoring the wireless traffic.

In block 42, the operator interacts with the wireless network device. In this case, the priorities are set to the operator defined priorities in the block 44.

In the block 46, assume that some threshold has been met in the wireless network traffic. In this case, control is then directed to automatically setting the priorities in a block 48. Thus resetting the priority in the block 48 is based upon the threshold that is met. For example, if the threshold of a particular communication leg is exceeded, the priority may be increased to aid with network traffic conditions. Other thresholds that might be used include radio parameters, including power of signal, signal to noise ratio, error rate, to name a few.

In block 50, the priority setting wireless network device received a request from a request from another wireless network device for a priority change. In this case, an external wireless network device has generated a request to the wireless network device to either increase or decrease the priority that is associated with the particular external wireless network device. Control transfers to a block 52 where the priority-setting wireless network device determines whether to accept or deny such priority request.

If the request is accepted, control transfers to a block 54 in which the internal tracking of the priority is made within the priority setting on the wireless network device. It should be noted that such a request may be accepted in whole or in part.

If accepted in whole, the requested the level may be returned to the requesting wireless network device in a block 56. Or, if the priority setting wireless network device determines that a change should be made, but not to the effect requested by the external wireless network device, this new priority level is also sent to the external wireless network device.

If denied, the denial is sent back to the requesting device in a block 58. Control then returns to monitoring the network traffic in the block 36.

Figure 5:
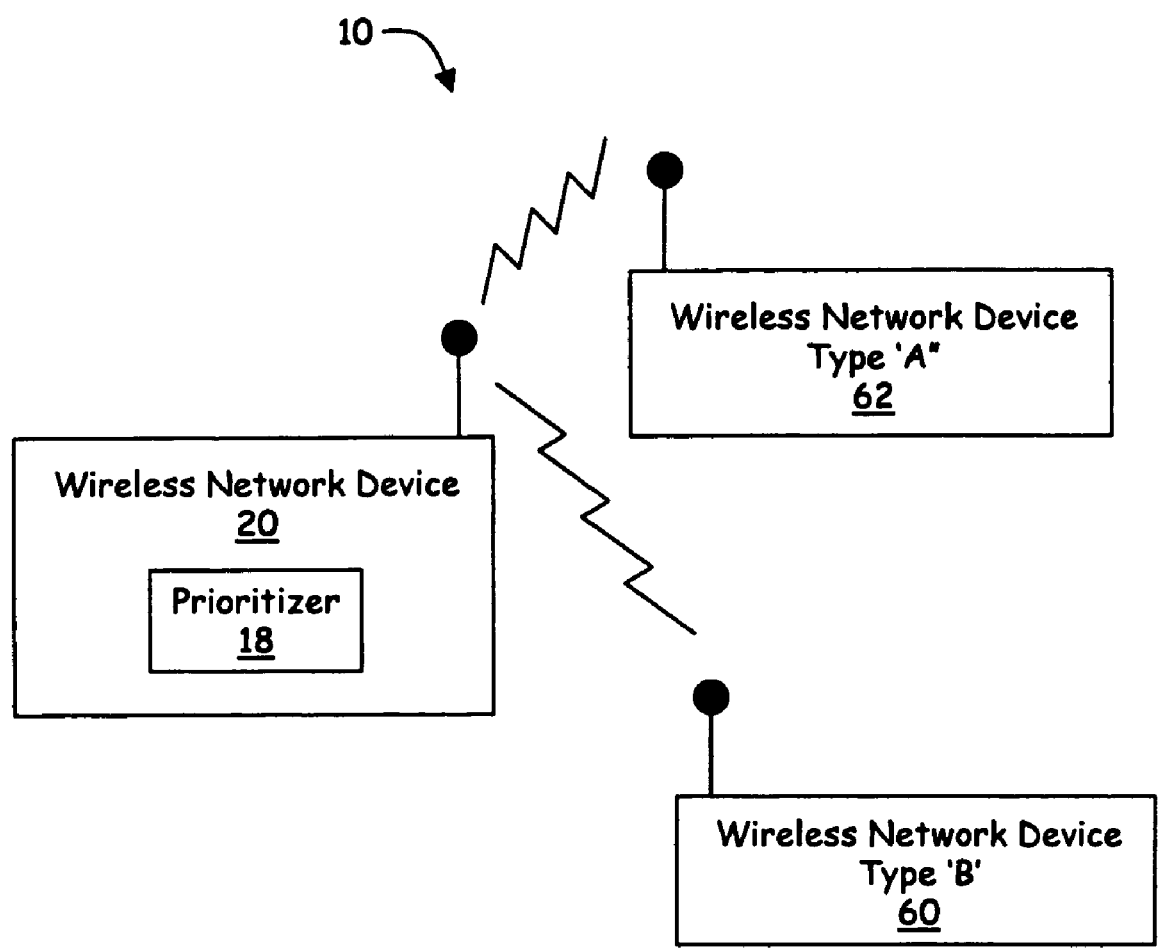
FIG. 5 is a block diagram detailing the use of the system in a wireless network with different types of devices according to the invention.

FIG. 5 is a block diagram detailing the use of the system in a wireless network with different types of devices according to the invention. Assume that the devices are of differing types and have differing backoff characteristics. Assume that the device 62 has the backoff characteristics as defined above. Also assume that the device 60 has a backoff characteristic of:

| Priority Level | Backoff Time |
|---|---|
| 1 | 7 |
| 2 | 12 |
| 3 | 27 |

In this case, the wireless network device 20 using the prioritizer 18 can generate the proper responses and requests to the specific differing devices to create and maintain the specific prioritization level within the network.

Thus, a method and apparatus for a system and method for determining priorities in a wireless network is described and illustrated. Those skilled in the art will recognize that many modifications and variations of the present invention are possible without departing from the invention. Of course, the various features depicted in each of the Figures and the accompanying text may be combined together. Accordingly, it should be clearly understood that the present invention is not intended to be limited by the particular features specifically described and illustrated in the drawings, but the concept of the present invention is to be measured by the scope of the appended claims. It should be understood that various changes, substitutions, and alterations could be made hereto without departing from the spirit and scope of the invention as described by the appended claims that follow.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A wireless network device comprising:
    a first circuit for receiving wireless messages from remote wireless network devices;
    a second circuit for sending wireless messages to the remote wireless network devices;
    a third circuit for monitoring and analyzing the nature of network traffic between the wireless network device and each of the remote wireless devices;
    a fourth circuit for making a determination of the relative priorities of the various remote wireless network devices, the fourth circuit determining the priority of one of the remote wireless network devices based at least in part on the volume of network traffic between the wireless network device and the one of the remote wireless network devices, wherein the fourth circuit increases the priority of the one remote wireless device to a higher priority in response to the third circuit determining that the volume of network traffic has increased beyond a predetermined threshold;
    a fifth circuit for forming a message to the remote wireless network devices, the message operable to set a backoff time in the one remote wireless network device, the backoff time related to the relative priority of the one remote wireless network device; and
    the second circuit operable to send the message from the fifth circuit to the one remote wireless network device.

2. The device of claim 1, further comprising a sixth circuit for allowing operator input information into the wireless network device, wherein the fourth circuit further determines priority based at least in part on the information input at the sixth circuit, as well as any network traffic increase.

3. The device of claim 1, wherein the fourth circuit further determines priority based at least in part on receiving a request from one of the remote wireless devices for a change in priority level for that remote wireless device.

4. The device of claim 3, wherein the fourth circuit determines whether to accept the request for a change in priority, and if accepted, whether the change is to be accepted in whole or in part.

5. The device of claim 4, wherein there are multiple levels of priority, wherein the request for a change in priority is for more than one level in priority, and wherein the request accepted in part is a change in priority to fewer levels than that requested.

6. The device of claim 1, wherein the relative priority determined at the fourth circuit is assigned to only specific data streams transmitted to one of the remote wireless devices.

7. The device of claim 1, wherein the third circuit is responsive to a newly detected remote network device, and wherein the fifth circuit forms a message to the newly detected remote device assigning a relative priority to the newly detected remote device.

* * * * *